No. 690,642. Patented Jan. 7, 1902.
M. A. DUNN.
SAFETY ATTACHMENT FOR HARNESS.
(Application filed Sept. 14, 1900. Renewed Oct. 17, 1901.)
(No Model.)
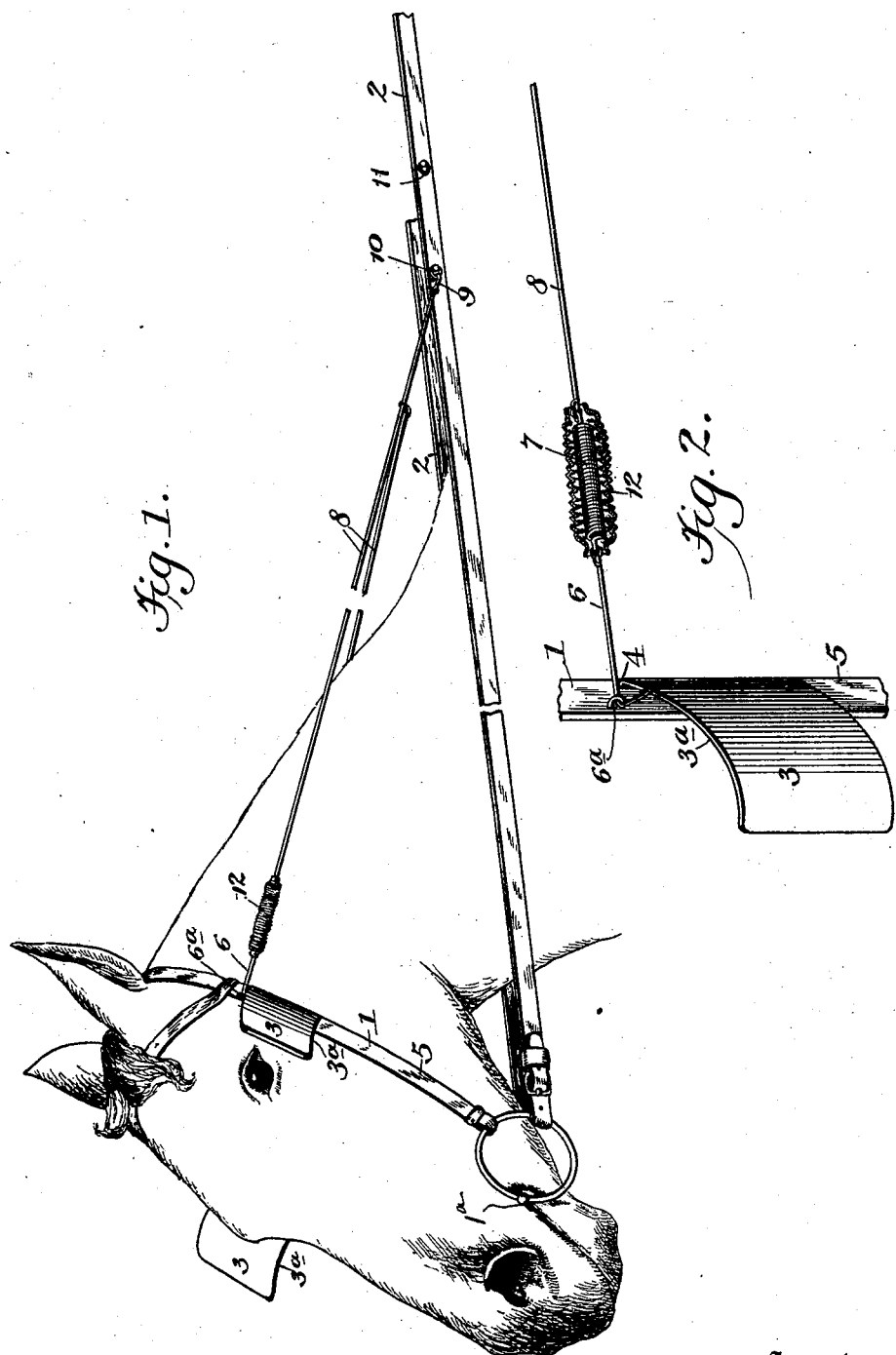

UNITED STATES PATENT OFFICE.

MARY AGNES DUNN, OF NEW YORK, N. Y.

SAFETY ATTACHMENT FOR HARNESS.

SPECIFICATION forming part of Letters Patent No. 690,642, dated January 7, 1902.

Application filed September 14, 1900. Renewed October 17, 1901. Serial No. 79,030. (No model.)

*To all whom it may concern:*

Be it known that I, MARY AGNES DUNN, a citizen of the United States, residing at New York, in the county and State of New York, have invented certain new and useful Improvements in Safety Attachments for Harness, of which the following is a specification.

This invention relates to safety devices for harness; and it has for its object to provide adjustable blinder devices the position of which with respect to the eyes of the animal may be regulated by the driver from his seat.

It is well known that horses may be checked in flight and brought to a standstill by covering their eyes. With this fact in view I have provided adjustable blinders which may be mounted in the customary manner upon the head-gear of harness and which may be readily manipulated by the driver without leaving his seat to entirely obscure the vision of the horse. In this manner runaways may be brought to a standstill.

In the drawings, Figure 1 is a perspective view illustrating the operative position upon a horse of my improved blinders and the means for manipulating the same. Fig. 2 is a detail perspective view of the bridle, blinders, and means for manipulating the same, parts being broken away to show the several working parts.

Corresponding parts in both figures are denoted by the same numerals of reference.

Referring to the drawings, 1 designates a bridle, which is in the main of the usual or any preferred type and is connected with the other usual harness parts, including the reins 2. The bridle 1 embodies the customary bit 1ª, with which the reins 2 are connected.

The adjustable blinders may be, as far as the blinders proper, 3, are concerned, of the ordinary or any preferred type and are flexibly connected at one edge, as at 4, with one of the bridle-straps 5, in position to be swung in front of and over the horse's eyes or rearwardly of and away from the same.

Connected at one end with the top edge portion of each of the blinders proper, 3, and at the inner or forward face thereof is a line 6, and the other end of said line 6 is connected with one end of a coiled spring 7, the other end of which is connected with the forward end of a blinder-rein 8, which in use extends rearwardly in longitudinal relation to the driving-rein 2. The rein 8 is provided at its rear end with a hook 9 or other suitable device adapted for connection with loops, eyes, or rings 10 and 11, secured to or formed in the reins 2, adjacent the rear ends thereof. Guide-rings 6ª for the lines 6 may be provided upon the bridle to maintain the lines 6 and reins 8 in proper operative position.

Each of the springs 7 is provided with a tubular protective housing 12, of leather or other flexible and suitable material.

As above stated, there are two of the blinders proper, 3, the blinder-reins 8, and the several other parts enumerated; but preferably only one of the blinder-reins is provided with the hook 9, the other rein 8 being connected with that rein which carries the hook at a point adjacent to said hook, as illustrated. By this arrangement both of the reins may be manipulated by a single movement to connect the hook 9 with one of the loops or eyes 10 and 11.

It is understood that the blinders proper, 3, normally project away from or rearwardly of the eyes of the horse, as is customary in bridle construction, and the function of the blinder-reins is to move the blinders proper into a forwardly-directed position over the eyes to obscure the vision.

In forming the blinders proper they are preferably given a concave curvature, as at 3ª, whereby they may more effectively cover the horse's eyes, and are covered with leather or other suitable yielding material to prevent injury to the eyes.

The operation and advantages of my invention will be readily understood. Normally the hook 9 is engaged with the foremost ring or eye 10 upon one of the driving-reins, and the blinders proper project rearwardly of or away from the eyes. When it is desired to "blind" the horse, the hook 9 is moved rearwardly and engaged with the rearmost ring 11 upon one of the driving-reins. This operation causes the blinder-reins 8 and lines 6 to swing the blinders proper forwardly into position to cover the horse's eyes. The interposition of the springs 7 between the lines 6 and blinder-reins 8 causes a positive though yielding binding of the blinders proper over the eyes, and the blinders proper are thus maintained in operative position against movement or "tossing" of the horse's head. It will be noted that with the hook 9 in connection with the rearmost ring 11, as last recited, the driving-reins are held taut to maintain the necessary strain upon the blinder-reins and that the more strain is imposed upon the driving-reins in curbing the horse by means of the bit 1ª the more positive becomes the "blinding" operation of the blinders. When the hook 9 is released from the said ring or eye 11, the blinders proper automatically assume their normal position away from the eyes, and the hook 9 is connected with the ring or eye 10 upon one of the driving-reins in position to be readily manipulated. The housings 12 protect the springs 7 against rust and breakage and may be made to correspond to the general appearance of the blinder-reins. The entire device is simple and efficient, and if matched in color and form to the other parts of the harness presents a neat and unobtrusive appearance.

It is obvious that modification and variation in detail features of construction and arrangement may be made, and I therefore reserve the right to all such modification and variation as properly comes within the spirit and scope of my invention and the terms of the following claims.

Having thus described my invention, I claim and desire to secure by Letters Patent—

1. The combination, with a bridle provided with a bit and an adjustable blinder proper, of a driving-rein connected with the bit, and a blinder-rein connected with the blinder proper and extending in longitudinal relation to the driving-rein, the driving-rein being provided with a plurality of rings or similar devices secured to the same in spaced relation, and the blinder-rein being provided with a hook or similar device adapted for separate connection with said rings, whereby the blinder proper may or may not be adjusted into "blinding" position when the driving-rein is drawn upon.

2. The combination, with a bridle provided with a bit and an adjustable blinder proper, of a driving-rein connected with the bit, a blinder-rein connected with the blinder proper and extending in longitudinal relation to the driving-rein, and a spring interposed between the blinder proper and the blinder-rein, the driving-rein being provided with a plurality of rings or similar devices secured to the same in spaced relation, and the blinder-rein being provided with a hook or similar device adapted for separate connection with the said rings, whereby the blinder proper may or may not be maintained in "blinding" position when the driving-rein is drawn upon.

3. The combination, with a bridle provided with a bit and an adjustable blinder proper, of a driving-rein connected with the bit, and tensional connection means between the blinder proper and the driving-rein, said connection means being adapted for connection with said driving-rein at a plurality of points, whereby adjustment of the blinder proper by the driving-rein may be regulated.

In testimony whereof I have signed my name in the presence of the subscribing witnesses.

MARY AGNES DUNN.

Witnesses:
J. R. LITTELL,
M. C. MATTES.